Jan. 11, 1966  A. N. ORMOND  3,228,240
LINEARIZATION OF LOAD CELLS
Filed Dec. 24, 1963  2 Sheets-Sheet 1

INVENTOR.
ALFRED N. ORMOND
BY
Elliott & Pastoriza
ATTORNEYS

Jan. 11, 1966  A. N. ORMOND  3,228,240
LINEARIZATION OF LOAD CELLS
Filed Dec. 24, 1963  2 Sheets-Sheet 2

INVENTOR.
ALFRED N. ORMOND
BY
*Elliott & Pastoriza*
ATTORNEYS

United States Patent Office 3,228,240
Patented Jan. 11, 1966

3,228,240
LINEARIZATION OF LOAD CELLS
Alfred N. Ormond, 11969 Rivera Road,
Santa Fe Springs, Calif.
Filed Dec. 24, 1963, Ser. No. 334,082
11 Claims. (Cl. 73—141)

This invention relates generally to load cells and more particularly to an improved means for linearization of the output signal from such load cells to the end that greater accuracy is provided.

This application is a continuation-in-part of my co-pending application Serial No. 112,341, filed May 24, 1961, and entitled System for Linearization of Load Cells, now abandoned and of my co-pending application Serial No. 208,869, filed July 10, 1962, and entitled Means for Linearization of Load Cells, now abandoned.

Conventional load cells usually comprise a deformable member or spring element incorporating strain gauges for providing an electrical output signal. This signal is a function of the deformation of said member as a consequence of a load applied to the member. The value of the output signal may be calibrated for various known loads applied to the cell to provide a proper scale. The load cell may then be employed in other environments to measure specific loads.

In present day load cells, however, the output signal is not linear with a change in load. This is a consequence of extraneous strains affecting the linearity of the output signal.

Such extraneous strains result from physical changes in the load cell itself under deformation, inability to provide a constant current in the electrical bridge portion of the ercuit constituting part of the signal transducer means, temperature variations, and non-linearities in the particular strain gauges employed. If these extraneous strains could be compensated for, a more accurate output signal could be provided.

In the first mentioned of my foregoing patent applications, compensation was achieved by providing additional strain gauges of the conventional wire or foil types connected to the cell to provide further signals used to compensate the extraneous signals from the principal strain gauges. However, I have now found that inclusion of these types of strain gauges may introduce a large resistance in the input circuit thereby decreasing the effective voltage across the bridge. The output reading as expressed in millivolts per volt input is therefore appreciably less for maximum or 100 percent loading, thereby contributing to the non-linearity of the signal to be linearized.

With the foregoing in mind, it is a primary object of this invention to provide a load cell system in which a linear output signal is realized over substantially the entire range of loading for which the cell is designed.

More particularly, an object is to provide an improved load cell system incorporating improved compensating means for linearizing the output signal by compensating for extraneous strains in the system without introducing large resistances in the input circuit.

Briefly, these and other objects of this invention are attained by employing auxiliary compensating strain gauge means or transducers to generate a compensating signal in response to loading of the cell by the principal load. These generated signals, in turn, are electrically combined with the conventional output signals from the measuring strain gauges in such a manner as to cancel the undesirable extraneous effects produced in the principal signals so that the resulting net output signal is substantially linear.

The use of semi-conductor type strain gauges is preferable in that the desired linearization can be achieved without introducing large resistance in the input circuit.

A better understanding of the invention will be had by referring to an exemplary embodiment thereof as shown in the accompanying drawings, in which.

Figure 1:
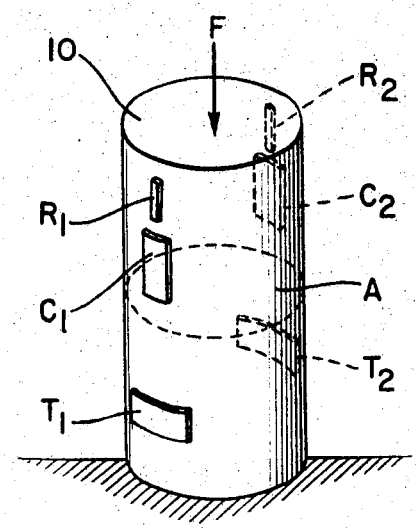
FIGURE 1 is a schematic diagram showing a simple type of load cell incorporating transducer means in accordance with the present invention.

Referring first to FIGURE 1, there is shown a load cell in the form of a deformable cylindrical member 10. As shown, there are provded first transducer means including a first pair of strain gauges $T_1$ and $T_2$ connected on diametrically opposite portions of the member 10. These gauges change their resistances in response to tension forces developed as a consequence of an applied load indicated by the arrow F in FIGURE 1. The first transducing means also includes a pair of strain gauges $C_1$ and $C_2$ oriented to change their resistances in response to compression forces resulting from the applied load force F.

Figure 2:
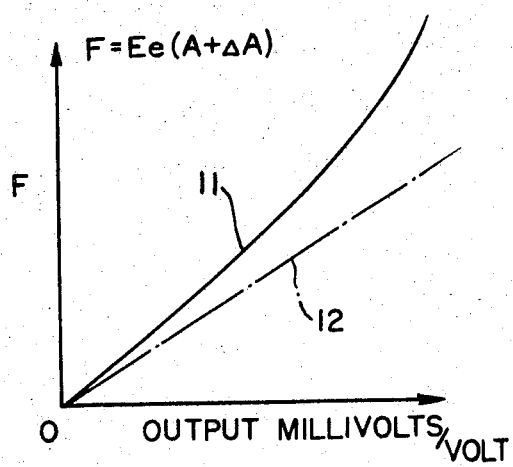
FIGURE 2 is a plot of an output signal in millivolts per volt as a function of loading in compression of the load cell of FIGURE 1.

In the absence of further transducer means, the output signal from the transducers will be non-linear as indicated by the curve 11 of FIGURE 2. One reason for this non-linearity, for example, is the fact that the applied force results in an actual physical change in the cross-sectional area of the load cell. For example, compression of the cylindrical member 10 of FIGURE 1 will tend to circumferentially expand the member as a consequence of physical displacement of the matter in the cylinder. Such action will increase the cross-sectional area indicated by A in dotted lines. Since the stress developed is a function of the force divided by this area, the stress then becomes a function of the force divided by the area plus a small incremental change in the area. This relationship is indicated by the formula in FIGURE 2 showing that F itself will not be linear as a consequence of the physical change in the area of the member 10. Thus, the strain $e$ which is equal to the stress divided by Young's modulus of elasticity E when plotted against the force F will result in a non-linear curve 11.

Other factors aside from the small incremental change in the cross-sectional area of the load cell 10 will result in non-linearity of the output signal. For example, the electrical characteristics of a strain gauge bridge into which the strain gauge members are connected are non-linear because it is not possible to realize a perfectly constant current in the arms of the bridge. Also, the physical properties of the strain gauges themselves are non-linear and temperature sensitive. In other words, a unit deformation will not always result in a consistent change in the resistance over the range of the gauge.

The non-linearity caused by the various extraneous strains derived from the foregoing sources decrease the overall accuracy of the instrument.

To overcome or compensate for these extraneous strains in accordance with the present invention, there are provided novel additional transducer means which take the form of additional strain gauges indicated at $R_1$ and $R_2$ in FIGURE 1. Preferably, these additional strain gauges are of semi-conductor type strain gauges and are connected to be responsive to the loading F so that their resistance values will also change with changes in the loading F. These additional strain gauges are then connected into the bridge circuit for the principal strain gauges as illustrated in FIGURE 3.

Figure 3:
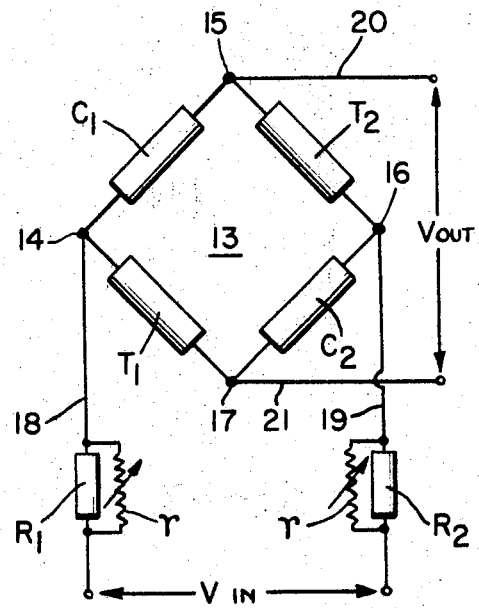
FIGURE 3 is an electrical circuit diagram illustrating a first arrangement of the strain gauges in FIGURE 1 in an electrical bridge.

With particular reference to FIGURE 3, there is shown a strain gauge bridge 13 wherein the tension strain gauges $T_1$ and $T_2$ are connected in opposite arms and the compression strain gauges $C_1$ and $C_2$ are connected in the remaining opposite arms. These arms are connected together to define vertices 14, 15, 16 and 17. Opposite vertices 14 and 16 are connected through leads 18 and 19 to a source of voltage $V_{in}$ to define an input diagonal of the bridge. Opposite vertices 15 and 17, on the other hand, connect through output leads 20 and 21 to a suitable indicator or recorder $V_{out}$ to define an output diagonal of the bridge. An example of an indicator would be a simple vacuum tube voltmeter to provide a reading of the $V_{out}$ as indicated in FIGURE 3.

When the voltage source is of low impedance, the second transducer means providing the desired compensation in the form of the additional strain gauges $R_1$ and $R_2$ are connected in series in the input diagonal between the bridge circuit 13 and the voltage source $V_{in}$. Small trimming resistances such as indicated at $r$ may be shunted across $R_1$ and $R_2$ to enable adjustment of the compensating gauges.

Figure 4:
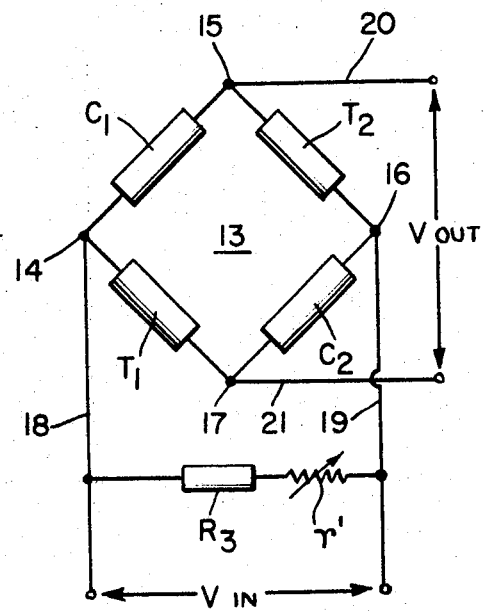
FIGURE 4 shows a second bridge circuit arrangement.

If a high impedance source is employed rather than a low impedance source, the compensating transducer means in the form of a strain gauge $R_3$ and series trimming resistance $r'$ would be connected across the source input leads 18 and 19 as shown in FIGURE 4 to provide a parallel path in the input diagonal for current supplied to the bridge.

Figure 5:
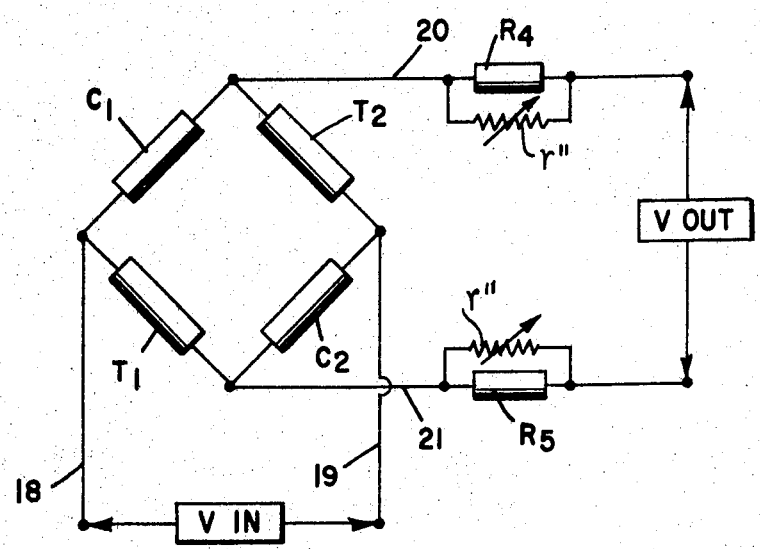
FIGURE 5 shows a third bridge circuit arrangement.

Similarly, if a low impedance indicator or recorder is used at the output, series compensation can be provided in the output diagonal leads 20 and 21 rather than in the input diagonal leads 18 and 19 as shown at $R_4$ and $r''$ and $R_5$ and $r''$ in FIGURE 5.

Figure 6:
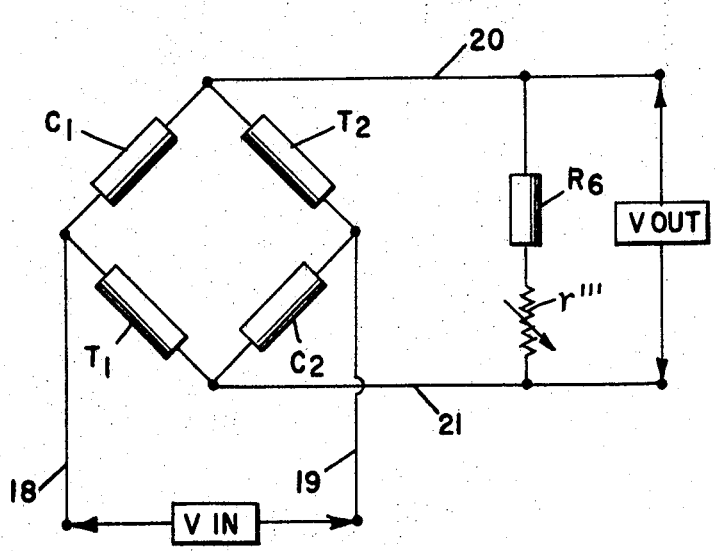
FIGURE 6 shows a fourth bridge circuit arrangement.

If a high impedance indicator or recorder is used, the compensating means is connected in parallel with the output diagonal leads 20 and 21 as shown at $R_6$ and $r'''$ in FIGURE 6.

Moreover, the series type compensation could be effected by incorporating a series connected compensating gauge in only one of the leads 18 and 19, or 20 and 21 rather than in each of the input or output leads.

In each arrangement, changes in the compensating resistances will occur and thus control the signal to the bridge circuit 13 or the signal at the output of the bridge. The degree of control, as mentioned, can be adjusted by the trimming resistances such as to insure that the final output voltage $V_{out}$ will be absolutely linear with changes in the loading F.

Since semi-conductors exhibit up to fifty times the sensitivity of normal strain gauge material made of metallic conductors, it is preferable to employ semi-conductor type strain gauges in the circuits of FIGURES 3, 4, 5 and 6.

As an example of the improvement afforded by the use of semi-conductor strain gauges, consider the circuit of FIGURE 3. If $R_1$ and $R_2$ constituted the conventional type of strain gauges, there would be introduced a series resistance of perhaps 1,000 ohms to provide necessary compensating signals. As a result, the actual voltage across the bridge would be considerably less so that the millivolt per volt output reading would be less than its correct value at full load.

If now semi-conductor strain gauges are used as $R_1$ and $R_2$, the series resistance introduced need only be 20 ohms, for example, with the provision of the same magnitude compensating signals. As a result, the voltage across the bridge is not materially different from the input voltage so that a far more accurate millivolt per volt output signal is provided at the output. The curve 11 in FIGURE 2 is thus brought into coincidence with the desired linear curve 12.

An example of one type of semi-conductor strain gauge which could be used for the correcting resistances would be silicon doped with P-type or N-type impurities.

While the particular embodiment of the invention has taken the form of a cylindrical load cell as illustrated in FIGURE 1, it should be understood that the principles are applicable to other shaped load cells for measuring other types of forces or loads. The improved means for linearizing the load cells is therefore not to be thought of as limited to the particular embodiments set forth merely for illustrative purposes.

What is claimed is:

1. A linear load cell comprising, in combination: a deformable member; first transducer means connected to said member and responsive to deformation of said member as a consequence of a load applied to said member to provide a first output signal having a non-linear characteristic, said first transducer means comprising strain gauges arranged in an electrical bridge network having diagonals defining input and output connections for said bridge; a second transducer means connected to said member and responsive to deformation of said member as a consequence of said load to provide a second output signal having a value that is a function of said load; and means for connecting said second transducer means to at least one of said diagonals of said bridge to provide a net output signal constituting a combination of said first and second output signals which is linear.

2. A cell, according to claim 1, in which said first transducer means comprises a first pair of strain gauges changing their resistances in response to tension forces generated in said member by said load; and a second pair of strain gauges changing their resistance in response to compression forces generated in said member by said load; said electrical bridge including said first pair of strain gauges connected in two opposite arms of said bridge and said second pair of strain gauges connected in the remaining opposite arms of said bridge; a source of voltage connected across opposite vertices of said bridge to define said input diagonal; an indicating means connected across the remaining opposite vertices of said bridge to define said output diagonal, said second transducer means comprising correcting strain gauge means having a resistance which varies as a function of said loading secured to said member.

3. A cell, according to claim 2, including variable trimming resistance means connected to said correcting strain gauge means for adjusting the overall resistance value of said correcting strain gauge means under any given load.

4. A cell according to claim 2, in which said correcting strain gauge means includes a semi-conductor strain gauge.

5. A cell, according to claim 4, in which said semi-conductor strain gauge comprises silicon doped with N-type impurities.

6. A cell, according to claim 4, in which said semi-conductor strain gauge comprises silicon doped with P-type impurities.

7. A cell, according to claim 2, in which said correcting strain gauge means is connected in series with said input diagonal.

8. A cell, according to claim 2, in which said correcting strain gauge means is connected in parallel with said input diagonal.

9. A cell, according to claim 2, in which said correcting strain gauge means is connected in series with said output diagonal.

10. A cell, according to claim 2, in which said correcting strain gauge means is connected in parallel with said output diagonal.

11. A load cell spring element strain gauge bridge circuit for generating an output substantially linearly related to loads applied to the spring element, said circuit comprising four similar strain gauging means operatively attached to a surface of said spring element and connected to define a four-arm bridge network having input and output diagonals, and a correcting strain gauging means connected serially with one of said diagonals and operatively attached to a spring element surface and generating a variable series impedance in accordance with loads applied to said spring element.

No references cited.

RICHARD C. QUEISSER, *Primary Examiner*.